Dec. 15, 1959  J. E. RIDDLE  2,917,267

CLAMP

Filed Dec. 7, 1956

INVENTOR.
JOSEPH E. RIDDLE
BY

ATTORNEY

United States Patent Office 2,917,267
Patented Dec. 15, 1959

2,917,267

CLAMP

Joseph E. Riddle, Woodland Hills, Calif., assignor to Librascope, Incorporated, Glendale, Calif., a corporation of California Application December 7, 1956, Serial No. 627,003

5 Claims. (Cl. 248—361)

This invention relates to a new and improved clamp and more particularly to a clamp adapted for use in securing an object to a frame in inaccessible places.

One of the objects of this invention is to provide a clamp for holding objects to a frame or the like, which can be tightened solely by rotation of the screw securing the clamp to the frame.

Another object of this invention is to provide a clamp which will turn into clamping relationship with the object being held when the screw is tightened and will turn out of clamping relationship with the object being held when the screw is loosened.

A further object of this invention is to provide a clamp that will remain in a desired position before being tightened down by its own inertia and will not have to be independently held in place until the object to be clamped is positioned.

Other objects and advantages of this invention will become apparent as the discussion proceeds, and are taken in connection with the accompanying claims and drawings, in which, Figure 1 is an exploded perspective view showing a clamp illustrating the prior art;

Figure 1:
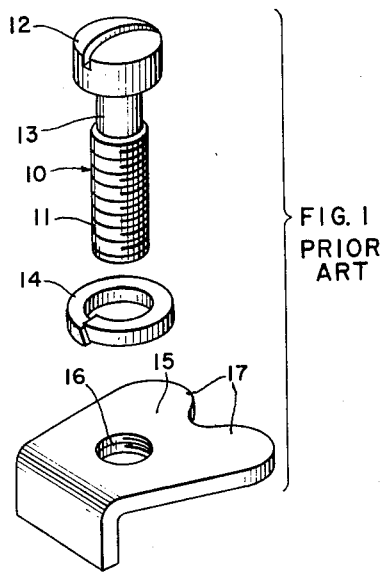

Turning now to a detailed description of the figures:

The numeral 10, Figure 1, designates generally a bolt having threads 11, a head 12 and a reduced shank 13. The numeral 14 designates a conventional lock washer and 15 a clamping element provided with a hole having threads 16 therein. The threads 16 are of a size to receive the male threads 11 on the bolt 10. Shoulders or tabs 17 are provided on the clamp element 15 as shown. The objection to this type of a clamp for detachably retaining in place objects confined in small spaces, such as a component like a synchro in a computer, is that there is not sufficient space to reach down beside the synchro and at the same time hold the clamping element 15 turned away from the object to be clamped.

In order to accomplish this it is necessary to reach down into the confined space with an additional tool or tools and to hold the clamping element 15 turned away from the object to be clamped until such object is positioned in the desired location. Then while still holding the synchro, or the like, in place, it is necessary to put the clamping element 15 into place and then start the screw threads 11 into the frame, and then tighten this screw down with a screw driver or the like. Usually this will require the use of a specially designed tool or a multiplicity of such tools. The use of this multiplicity of holding members and tools has proven to be very time-consuming, and it is extremely difficult to clamp the component, such as the synchro, or the like, into place with absolute accuracy.

The clamp embodying this invention is so constructed as to overcome these difficulties, and, briefly described, it stays in place while the screw is loose and turns into the object to be clamped by the simple expedient of tightening the bolt.

Figure 2:
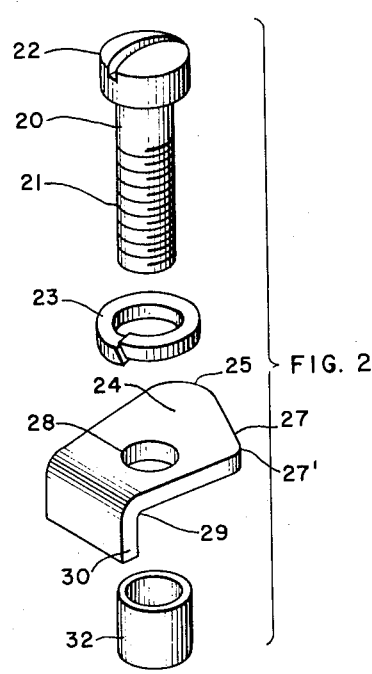
Figure 2 is an exploded perspective view of the clamp embodying my invention.
Figure 3:
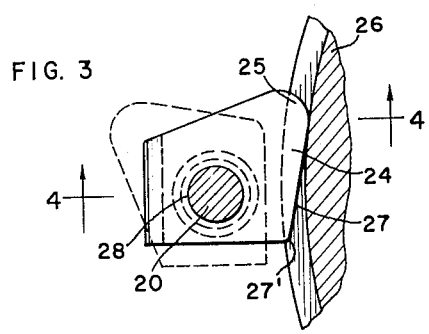
Figure 3 is a plan view partially in section taken along the line 3—3 of Figure 4 showing the clamp embodying my invention in place.

Turning now to a detailed description of Figures 2 through 5, inclusive, the numeral 20 designates a bolt generally having threads 21 and a head 22. The numeral 23 designates generally a conventional lock washer. The numeral 24 designates a clamping element which is provided with a lip 25. The lip 25 is formed at one corner of the clamping element 24 and the edge extending from the lip 25 and the adjacent component to be clamped, 26, is designated generally at 27. As shown, the edge 27 flares inwardly away from the component 26. An aperture, or hole, 28 is provided in the clamping element 24, as shown in Figures 2 and 3. The location of the center of the hole 28 is of considerable importance, and, as shown in Figure 3, this center is not in the center of the clamping element 24, but is located preferably closer to the corner of the clamp diagonally opposite the lip 25. It is here pointed out that this clamping element is made for a bolt having right hand threads, and should a left hand threaded bolt be used, the lip 25 and the hole 28 would be reversed in respect to their corners. The clamping element 24 is bent angularly forward at 29 to form a fulcrum portion 30 for the purpose of supporting the clamping element 24 against a frame 31, or the like.

A study of Figure 3 will show that the center of hole 28 can be located at any point in the half of the clamp opposite the lip 25 so as to always make the center of the hole a greater distance from the lip 25 than it is from the corner 27'.

Figure 5:
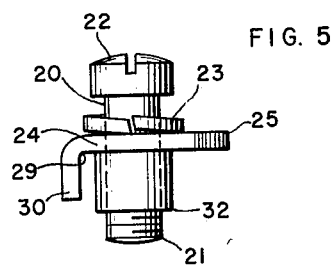
Figure 5 is an assembled plan view of the clamp embodying my invention.
Figure 4:
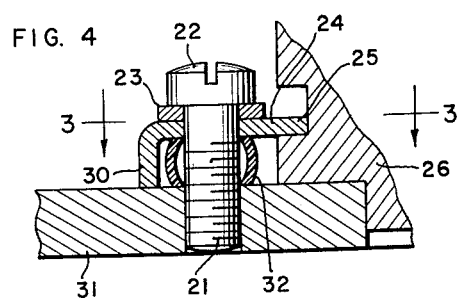
Figure 4 is a section view taken along the line 4—4 of Figure 3.

A resilient sleeve 32 which may be made of rubber, or a rubber substitute such as "Duprene," or other plastic resilient material, is provided on the underside of the clamp, as shown in Figure 5. This tube is slid onto the bolt threads 21 and frictionally engages the same when the clamp is assembled. When the clamp is tightened down, as shown in Figure 4, the resilient tube 32 is depressed outwardly.

As will be seen from the drawings, the clamping element 24 can be turned, as shown in dotted lines in Figure 3, completely away from the component to be clamped. This permits the insertion beside the clamp and clearing of the component 26. The bolt 20 is loosened but slightly in this position and the resilient tube 32 embraces in a friction grip the underside of the clamping element 24, thereby preventing either right or left hand turning, or other movement of the clamping element 24, until desired. After the component 26 is placed in the desired position, a screw driver or other turning tool is inserted into the head 22. After screw 20 is turned clockwise, the component clamping element 24 will be turned into position from the dotted lines shown in Figure 3 to the solid lines of this same figure. The edge 27 of the component clamp then bearing against the component 26 prevents further turning of the clamping element 25 as the screw is turned clockwise until tightened. The reverse procedure takes place when loosening the clamp from the component. The bolt 20 is turned in a counterclockwise direction and as the pressure on the clamp 24 is released so that there is no pressure between the component and the clamp being held, the resilient tubular element 32, while still serving as a friction grip on the underside of the clamp element 24, permits a gradual turning thereof to the position shown in dotted lines in Figure 3, after which step the component 26 can be withdrawn from its place. Obviously, if a left hand thread is used and the clamping element lip 25 and hole 28 are reversed from corner to corner, the reverse procedure for insertion and removal will be followed.

It is to be understood that various changes in size and shape can be resorted to without departing from the spirit of my invention, which is set forth in the appended claims.

I claim:

1. A clamp assembly comprising a bolt with a head and a threaded shank; a clamping element provided with a lip adapted to engage an object to clamp the same to a frame, a fulcrum portion extending angularly forward at the edge opposite said lip, and an aperture through said clamping element located between said lip and said fulcrum portion, said aperture being proportioned to receive the shank of said bolt sufficiently loosely to permit cocking of said clamping element on said shank, and means for holding said bolt and clamping element in assembled relationship prior to attachment thereof to a frame comprising a resilient tube frictionally engaging the shank of said bolt and being positioned on the side of said clamping element opposite the head of said bolt, said tube having an edge adapted to engage the side of said clamping element opposite the head of said bolt to transmit rotation of said bolt to said clamping element as an incident to attachment of said object to said frame said tube being of a size to firmly grip into the threads of said bolt.

2. A clamp assembly comprising a bolt with a head and a threaded shank, a clamping element adapted to engage an object to clamp the same to a frame provided with a single lip at one corner of said clamping element adapted to engage said object, the edge of said clamp adapted to engage said object flaring inwardly and a fulcrum portion extending angularly forward at the edge opposite said lip, said clamping element having an aperture therethrough and being proportioned to receive the shank of said bolt sufficiently loosely to permit sliding of said bolt through said aperture and cocking of said clamping element, the center of said aperture being located nearer the corner diagonally opposite said lip whereby the rotation of the bolt into the frame will frictionally engage the clamping element and cause the lip on said clamping element to engage the object.

3. A clamp assembly comprising a bolt with a head and a threaded shank, a clamping element adapted to engage an object to clamp the same to a frame provided with a single lip at one corner of said clamping element adapted to engage said object, the edge of said clamp adapted to engage said object flaring inwardly, a fulcrum portion extending angularly forward at the edge opposite said lip, said clamping element having an aperture therethrough and being proportioned to receive the shank of said bolt sufficiently loosely to permit sliding of said bolt through said aperture and cocking of said clamping element, the center of said aperture being located nearer the corner diagonally opposite said lip whereby the rotation of the bolt into the frame will frictionally engage the clamping element and cause the lip on said clamping element to engage the object, and means for holding said bolt and clamping element in assembled relationship prior to attachment thereof to a frame comprising a resilient tube frictionally engaging the shank of said bolt, said tube having an edge adapted to engage said clamping element to transmit rotation of said bolt to said clamping element as an incident to attachment of said object to said frame.

4. A clamp assembly comprising a bolt with a head and a threaded shank, a clamping element adapted to engage an object to clamp the same to a frame provided with a single lip at one corner of said clamping element adapted to engage said object, the edge of said clamp adapted to engage said object flaring inwardly, and a fulcrum portion extending angularly forward at the edge opposite said lip, said clamping element having an aperture therethrough and being proportioned to receive the shank of said bolt sufficiently loosely to permit sliding of said bolt through said aperture and cocking of said clamping element, the center of said aperture being located at a point a greater distance from the lip than from the corner adjacent the lip and the edge adapted to engage the object to be clamped, whereby the rotation of the bolt into the frame will frictionally engage the clamping element and cause the lip on said clamping element to engage the object.

5. A clamp assembly comprising a bolt with a head and a threaded shank, a clamping element adapted to engage an object to clamp the same to a frame provided with a single lip at one corner of said clamping element adapted to engage said object, the edge of said clamp adapted to engage said object flaring inwardly, a fulcrum portion extending angularly forward at the edge opposite said lip, said clamping element having an aperture therethrough and being proportioned to receive the shank of said bolt sufficiently loosely to permit sliding of said bolt through said aperture and cocking of said clamping element, the center of said aperture being located at a point a greater distance from the lip than from the corner adjacent the lip and the edge adapted to engage the object to be clamped, whereby the rotation of the bolt into the frame will frictionally engage the clamping element and cause the lip on said clamping element to engage the object, and means for holding said bolt and clamping element in assembled relationship prior to attachment thereof to a frame comprising a resilient tube frictionally engaging the shank of said bolt, said tube having an edge adapted to engage said clamping element to transmit rotation of said bolt to said clamping element as an incident to attachment of said object to said frame.

References Cited in the file of this patent

UNITED STATES PATENTS

| | | |
|---|---|---|
| 1,835,728 | Urfer | Dec. 8, 1931 |
| 1,861,807 | Mali | June 7, 1932 |
| 2,285,728 | Leinen | June 9, 1952 |